United States Patent
Borsos et al.

(10) Patent No.: US 8,069,614 B2
(45) Date of Patent: Dec. 6, 2011

(54) SEALING STRIP AND VEHICLE FRAME ASSEMBLY

(75) Inventors: Richard Borsos, Plymouth, MI (US); Sergio E. Romero, Beverly Hills, MI (US); Rajinder P. Singh, Plymouth, MI (US)

(73) Assignees: Ford Global Technologies, LLC, Dearborn, MI (US); Toyoda Gosei Co., Ltd., Aichi (JP)

( * ) Notice: Subject to any disclaimer, the term of this patent is extended or adjusted under 35 U.S.C. 154(b) by 336 days.

(21) Appl. No.: 11/578,171

(22) PCT Filed: Apr. 22, 2005

(86) PCT No.: PCT/US2005/013902
§ 371 (c)(1),
(2), (4) Date: Jul. 11, 2008

(87) PCT Pub. No.: WO2005/110787
PCT Pub. Date: Nov. 24, 2005

(65) Prior Publication Data
US 2009/0001765 A1    Jan. 1, 2009

Related U.S. Application Data

(60) Provisional application No. 60/566,960, filed on Apr. 30, 2004.

(51) Int. Cl.
*E06B 7/22* (2006.01)

(52) U.S. Cl. .................................. 49/498.1; 49/495.1

(58) Field of Classification Search ............... 49/475.1, 49/490.1, 489.1, 498.1, 495.1
See application file for complete search history.

(56) References Cited

U.S. PATENT DOCUMENTS 4,381,115 A    4/1983  Ko
(Continued)

FOREIGN PATENT DOCUMENTS

DE        20106758 U1    5/2002
(Continued)

OTHER PUBLICATIONS

European Patent Office, Office Communication for the corresponding European Patent Application 05 738 736.7 mailed Dec. 2, 2009.

(Continued)

*Primary Examiner* — Jerry Redman
(74) *Attorney, Agent, or Firm* — Ray Coppiellie; Brooks Kushman P.C.

(57) ABSTRACT

The present invention relates to an improved retention sealing strip (10) that improves the ease of assembly, and reduces manufacturing costs. The sealing strip (10) includes a retention section (28) having an upper hub (50), a first retention leg (54) positioned forward of the upper hub (50), a second retention leg (62) rearward (e.g., positioned at an inner-side of a vehicle cabin) of the first retention leg (54), an upper recess (52) positioned rearward of the upper hub (50), and a lower recess (58) positioned between the first and second retention legs (54, 62 respectively). The sealing strip (10) also includes a sealing section (30) integrally formed with the retention section (28).

21 Claims, 6 Drawing Sheets

U.S. PATENT DOCUMENTS

| | | | |
|---|---|---|---|
| 5,462,292 A | 10/1995 | Yamane | |
| 5,649,405 A | 7/1997 | Morihara et al. | |
| 6,499,257 B1 | 12/2002 | Tsuchida et al. | |
| 6,814,393 B2 | 11/2004 | Nagata | |
| 2002/0129558 A1* | 9/2002 | Baba et al. | 49/498.1 |
| 2004/0079032 A1* | 4/2004 | Russell et al. | 49/498.1 |
| 2006/0162258 A1* | 7/2006 | Yamashita et al. | 49/495.1 |

FOREIGN PATENT DOCUMENTS

| | | |
|---|---|---|
| EP | 0 627 334 | 12/1994 |
| GB | 1 522 347 | 8/1978 |
| JP | 58161636 A1 | 9/1983 |

OTHER PUBLICATIONS

NGB Corporation, Office Action with English translation for the corresponding JP 2007-510835, which is a Japanese national phase of PCT application, PCT/US2005/013902 mailed Jan. 25, 2011.

Supplementary European Search Report for corresponding European patent application No. EP 05 73 8736, mailed Jul. 29, 2008.

* cited by examiner

SEALING STRIP AND VEHICLE FRAME ASSEMBLY

CROSS REFERENCE TO RELATED APPLICATION

The present application is a 35 U.S.C. 371 national stage entry of International Patent Application No. PCT/US2005/013902, filed Apr. 22, 2005, which claims benefit of U.S. provisional patent application identified as Application Number 60/566,960, filed Apr. 30, 2004, the contents of which are herein incorporated by reference in their entirety.

BACKGROUND OF THE INVENTION

1. Field of the Invention

The present invention relates to a sealing strip having a retention section for coupling the sealing strip to a first frame member and a sealing section configured to sealingly contact a second frame member.

2. Description of the Related Art

Numerous sealing strips are commonly used in the art as an environmental barrier. In the automotive industry, sealing strips are used in numerous locations including between the vehicle door and part of the vehicle body. Sealing strips of the type described herein must provide a sufficiently strong coupling of the retention section to one of the frame members and an effective seal. The retention strength of the sealing strip is generally improved by increasing the rigidity or density of the retention section material. However, rigid and dense material may adversely impact ease of installation as well as reduce the effectiveness of the seals. In an attempt to obtain a suitable balance of these factors, many manufacturers commonly use different materials for the sealing and retention sections. Other approaches include using reinforcement in the retention section to improve rigidity and retention integrity and/or providing hollow chambers in a rigid or dense retention section material to facilitate installation. While these approaches may be suitable for many applications, the art has not adequately addressed the need to further improve sealing strip retention characteristics without increasing the manufacturing complexity of the strip.

SUMMARY OF THE INVENTION

In view of the above, the present invention relates to an improved retention section configuration that enhances sealing strip retention characteristics, improves the ease of assembly, and reduces manufacturing costs. The improved retention characteristics may be achieved through the use of a sealing strip that is integrally formed using a material of suitable density.

The sealing strip of the present invention includes a retention section having an upper hub, a first retention leg positioned forward of the upper hub, a second retention leg rearward (e.g., positioned at an inner side of a vehicle cabin) of the first retention leg, an upper recess positioned rearward of the upper hub, and a lower recess positioned between the first and second retention legs. The sealing strip also includes a sealing section integrally formed with the retention section. The invention also relates to a sealing assembly including a frame member defining a channel and a sealing strip coupled to the frame member. The sealing strip again includes a sealing section and a retention section. The retention section has an upper hub, a first retention leg, a second retention leg rearward of the first retention leg and the upper hub, and a lower recess positioned between the first and second retention legs.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
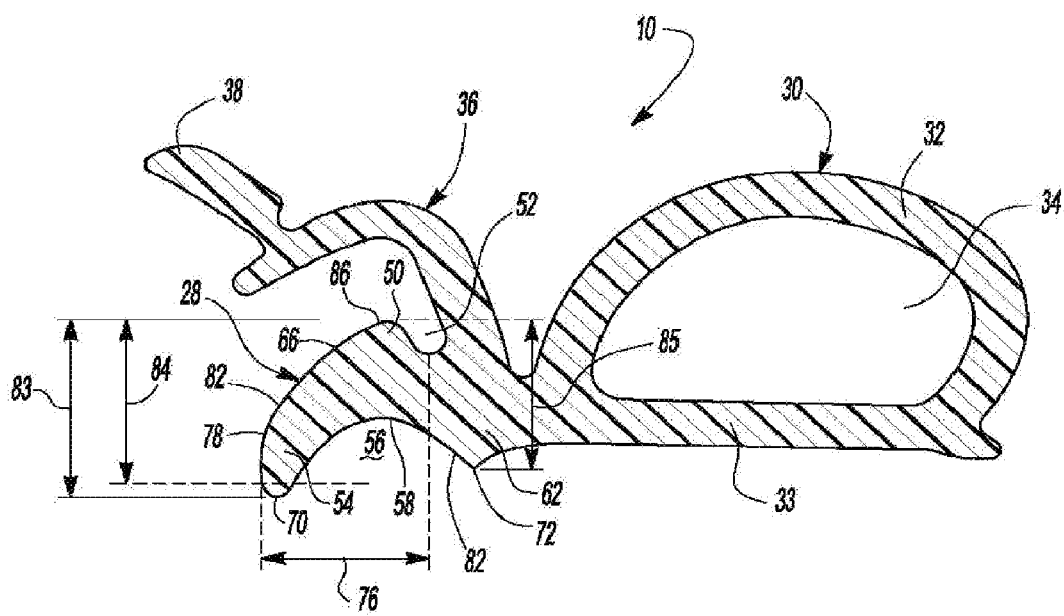
FIG. 1 is a cross-section of the sealing strip of the present invention.
Figure 2:
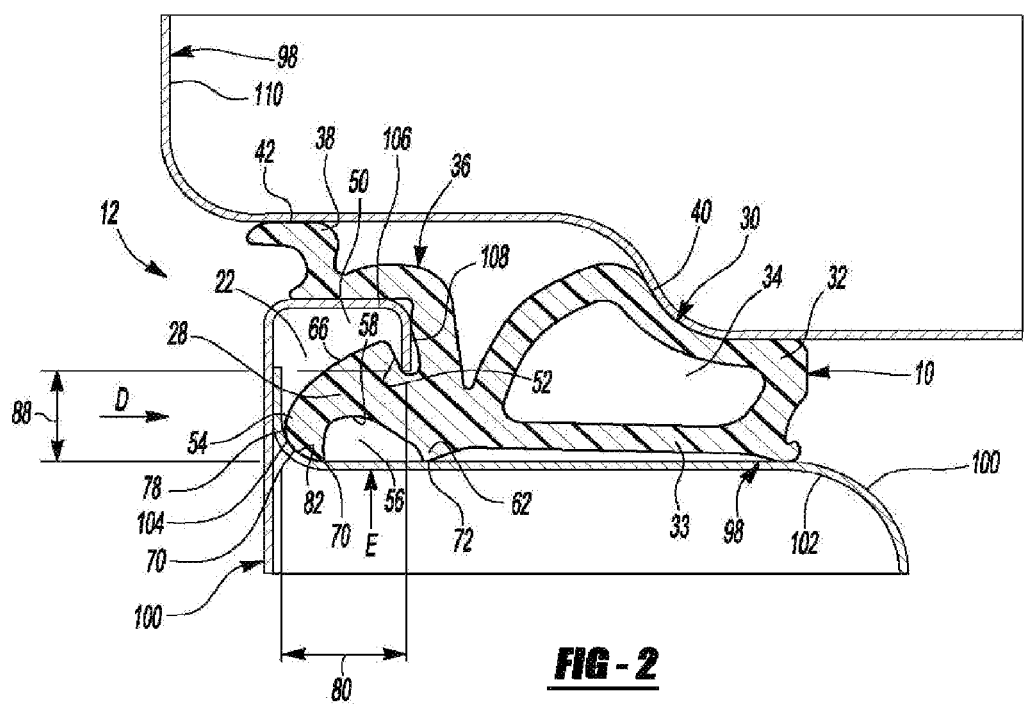
FIG. 2 is a cross-section of a frame assembly with the sealing strip shown in FIG. 1 installed therein.
Figure 3:
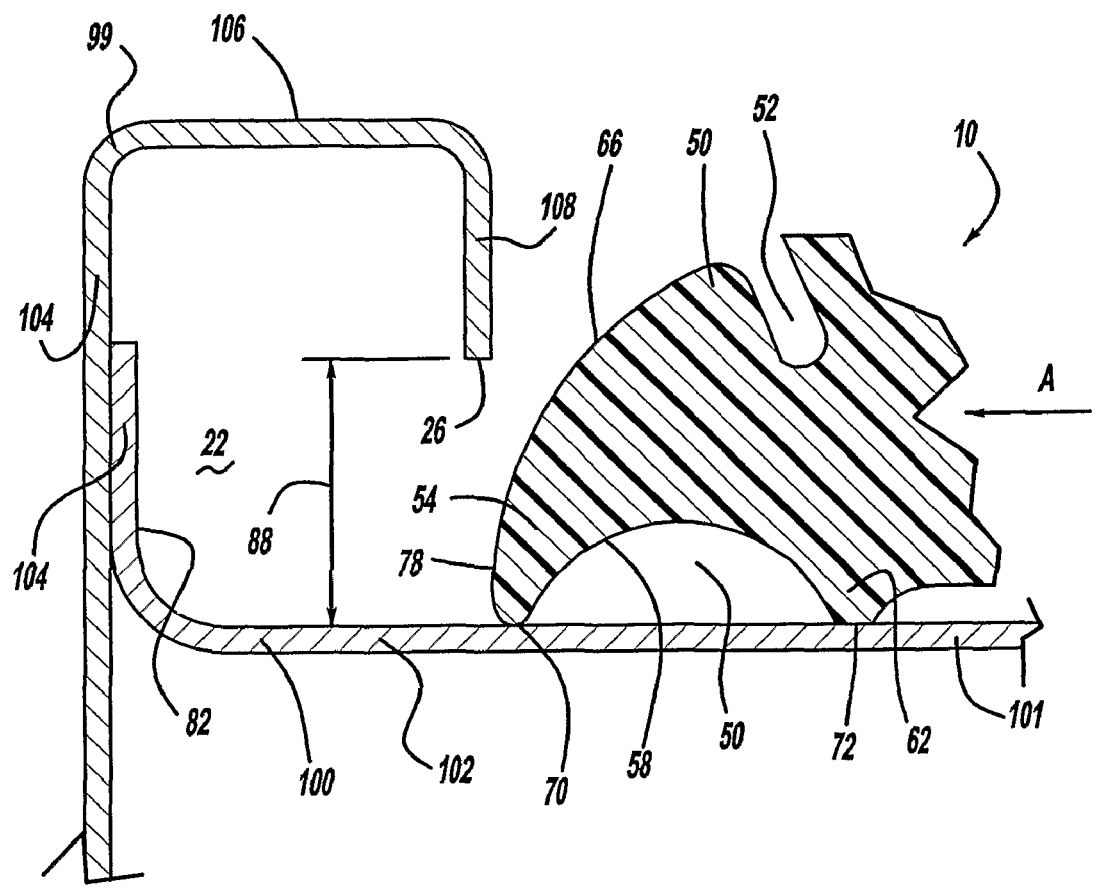
FIG. 3 is an enlarged partial cross-sectional view illustrating the installation of the sealing strip in the frame assembly.
Figure 4:
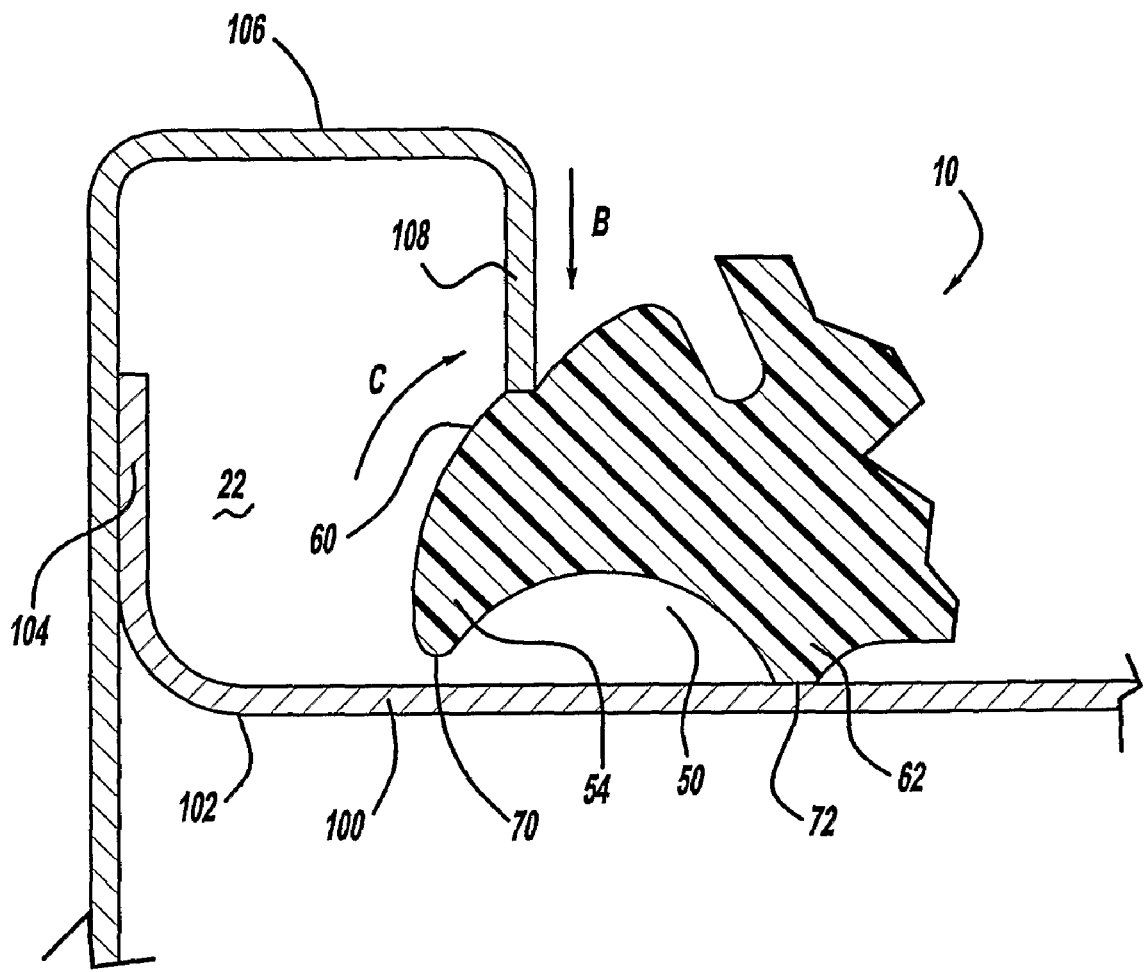
FIG. 4 is an enlarged partial cross-sectional view of the installation of the sealing strip in the frame assembly.

A weather strip or sealing strip 10 for a sealing assembly 12 (FIG. 2) is illustrated in FIGS. 1-4. The sealing strip 10 has a generally tubular and longitudinal form extending perpendicular to the cross-sectional view illustrated in FIG. 1. The sealing strip 10 includes a sealing section 30 and a retention section 28, which are generally formed in parallel. In use, as is shown in FIGS. 2-4, the sealing strip 10 is coupled to one member of a frame assembly 98, specifically a first frame member 100, and configured to seal against a second frame member 110. The first frame member 100 defines a channel 22 having an opening (FIG. 3) bounded on its upper end by a frame lip or flange 26. The channel 22 is generally defined by a first frame leg 102, a second frame leg 104, a third frame leg 106, and a fourth frame leg 108. The fourth frame leg 108 includes a frame flange 26 which faces the first frame leg 102 to define an opening 24 therebetween. The first frame member 100 may be formed from multiple parts, which form portions of the frame legs. As illustrated in the figures, an inner panel member 101 may form the first frame leg 102, and a portion of the second frame leg 104 while an outer panel member 99 may form the third frame leg 106, the fourth frame leg 108, and second frame leg 104. As illustrated, the outer panel member 99 forms the outer surface of a vehicle door although other configurations may easily be used. As used below and in the claims, forward and rearward generally refer to the position of items, with a forward item being closer to a front portion of the retention section 28, which is first inserted into the channel 22 of the frame assembly 98 to be retained and a rearward item being located further away from the front portion of the retention section 28.

The sealing section 30 may have a variety of configurations capable of providing one or more seal areas between a first frame member 100 such as a door and a second frame member 110 such as a vehicle body. By way of example, the sealing section 30 is shown generally in FIGS. 1 and 2 to include a sealing bulb 32, having a base portion 33 and a longitudinal hollow chamber 34, and a sealing arm 36 having a sealing lip 38. The sealing bulb 32 and sealing lip 38 are positioned to provide first and second seals 40 and 42, respectively, against the second frame member 110 when one of the first and second frame members 100 and 110 is in its closed position. Although the above description discusses the sealing strip 10 as being retained on a movable frame member 100 (e.g. a door), one may readily recognize that the sealing strip 10 may also be located on a stationary frame member (e.g. a body).

The retention section 28 includes an upper hub 50, an upper recess 52 between the upper hub 50 and the sealing arm 36, a first retention leg 54, a second retention leg 62 positioned rearward of the first retention leg 54 and the upper hub 50, and a lower recess 58 positioned between the first and second retention legs 54 and 62. The upper recess 52 accommodates the deflection of the upper hub 50 during installation and receives the fourth frame leg 108 and more specifically, the frame flange 26 when the retention section 28 is installed within the channel 22. The lower recess 58 accommodates the deflection of the upper hub 50 during installation and deflection of the first and second retention legs 54 and 62, as described below. The upper hub 50 is preferably a solid element formed of a single material and includes an upper surface 86. That is, the upper hub 50 preferably does not include a chamber or hollow cavity. In the preferred embodiment, although not necessary, the upper hub 50 is formed from a material having a uniform density. The upper hub 50 includes a leading contact surface 66 that is preferably convex to facilitate installation of the retention section 28 through an opening 24 on the first frame assembly 100. Therefore, the upper hub 50 has a convex shape as shown in FIGS. 1-4.

The retention section 28 also includes a first lower surface 70 on the first retention leg 54 and a second lower surface 72 on the second retention leg 62. The first lower surface 70 is equal to or lower than the second lower surface 72, relative to the upper hub 50 to improve installation and retention characteristics. By another way, the first retention leg 54 is longer than the second retention leg 62. More specifically, the upper surface 86 on the upper hub 50 and the first lower surface 70 define a first distance 83 and the second lower surface 72 and the upper surface 86 define a second distance 85, wherein the first distance 83 is greater than or equal to the second distance 85. The upper recess 52 is spaced a horizontal distance 76 from a front surface 78 of the first retention leg 54. The horizontal distance 76 is preferably greater than the space 80 between the frame flange 26 and an inner engagement surface 82 on the first frame-member 100 so as to ensure deflection of the first retention leg 54 when the sealing strip 10 is installed (FIG. 2). Further, the retention section 28 defines a vertical distance 84 between the upper surface 86 and the lowest of the lower surfaces 70 and 72 of the first and second retention legs 54 and 62. This vertical distance 84 is greater than the height 88 of the channel opening 24 so as to ensure the desired movement of the sealing strip 10 during installation as described below. In the illustrated embodiment, the first and second distance 83 and 85 is greater than the height 88 of the channel opening 24. Notwithstanding the configuration of the illustrated embodiment, those skilled in the art will appreciate that the configuration of the retention section 28 and its constituent components may be modified without departing from the scope of the invention defined by the appended claims.

During installation (see generally FIGS. 3 and 4), the sealing strip 10 is inserted into the channel 22 as shown in FIG. 3 and displaced in the direction of arrow "A" so that the upper hub 50 contacts the fourth frame leg 108. Further displacement of the sealing strip 10 causes a downward deflection of the retention section 28 (arrow "B" in FIG. 4), including rotational movement of the first retention leg 54 and the upper hub 50 in the direction of arrow "C" and deflection of the second retention leg 62. Therefore, the first lower surface 70 of the first retention leg 54 does not contact the first frame part 102 at this time. The large lower recess 56 allows downward deflection of the upper hub 50 to facilitate installation. When the hub 50 clears the frame flange 26 the resiliency of the second retention leg 62 causes upward and rotational movement of the retention section so that the hub 50 hooks the fourth frame leg 108, specifically the frame flange 26 (FIG. 2) within the upper recess 52 (FIG. 2) to facilitate retention. Retention is also enhanced by the engagement of the lower surface 72 of the second retention leg 62 against the inner-engagement surface 82 of the first frame member 100. This engagement, coupled with the engagement of the first retention leg 54 also with the inner engagement surface 82, acts to resist pivoting of the upper recess 52 relative to the fourth frame leg 108. When the sealing strip 10 is fully installed as shown in FIG. 2, the retention section 28 is inserted and retained in the channel 22 with the first retention leg 54 deflected to create a horizontal biasing force in the direction of arrow "D". Namely, the front surface 78 of the first retention leg 54 engages the wall defined by the inner engagement surface 82 on the first frame member 100 to create the horizontal biasing force. The biasing force created by the engagement of the first retention leg 54 with the inner engagement surface 82 coupled with the engagement of the lower surface 72 of the second retention leg 62 against the inner engagement surface 82 of the first frame member 100 act to enhance secure retention of the retention section 28 in the channel 22. In the illustrated embodiment, the retention of the sealing strip 10 may be further enhanced by sizing the second retention leg 62 such that this leg is also in a deflected state when installed thereby creating a vertical biasing force in the direction of arrow "E".

The retention section 28 and a sealing section 30 are preferably, though not necessarily, integrally formed (e.g., extruded) to improve manufacturing ease and reduce costs. The configuration of the retention section 28 provides numerous advantages over conventional sealing strips including facilitating the integral forming of the sealing strip 10, improving the ease with which the retention section 28 of the sealing strip 10 is installed in the channel 22, and enhancing the retention of the sealing strip 10 in a door/body sealing application, those skilled in the art will appreciate that the invention is equally suited for other vehicle sealing applications (e.g. trunk seals) as well as other non-vehicle applications (e.g. house windows and container seals).

Figure 5:
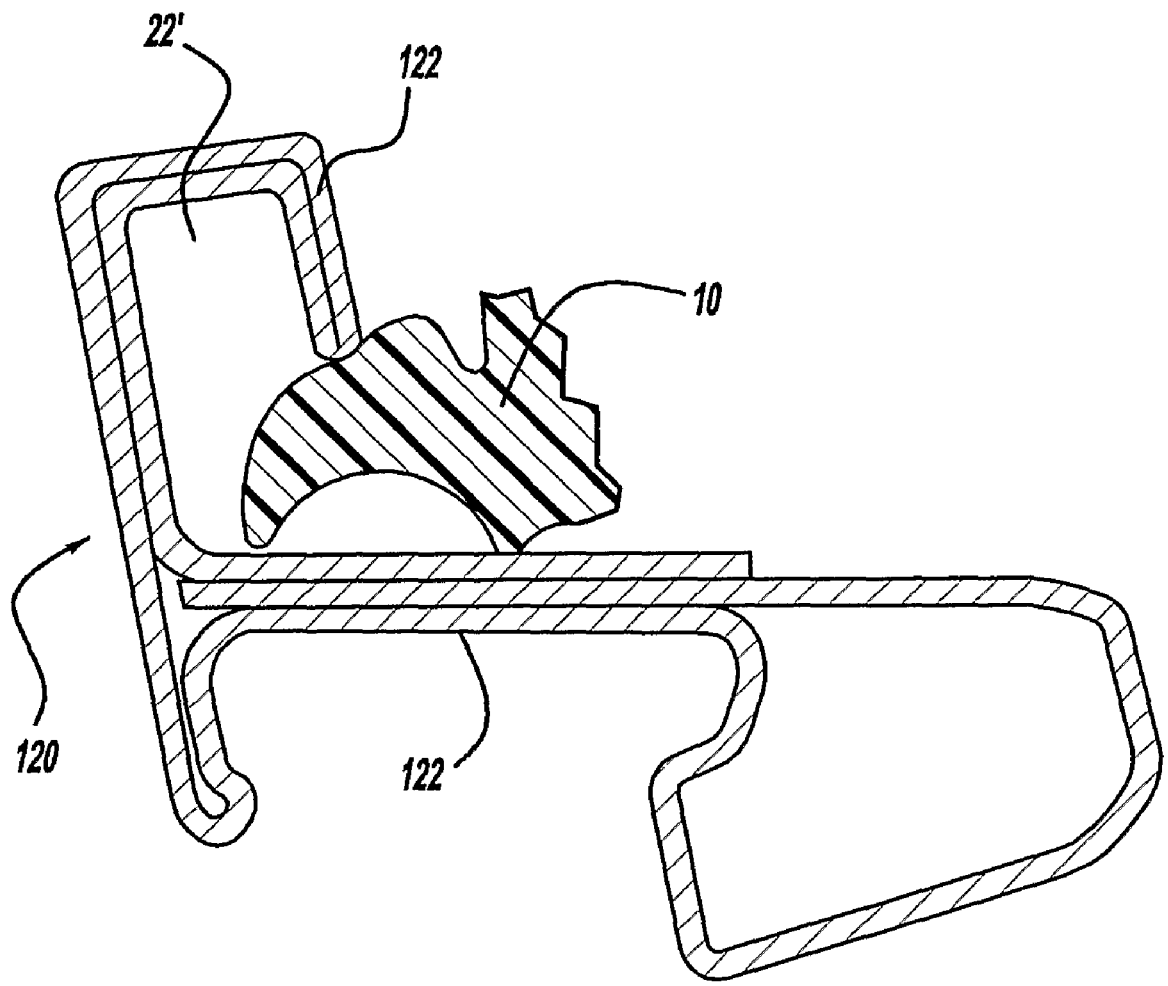
FIG. 5 is an enlarged partial cross-sectional view of the installation of the sealing strip of the present invention in an alternate embodiment of a frame assembly.

It is to be understood that variations of the frame assembly to which the sealing strip 10 of the present invention is attached are possible and will have virtually no impact on the method of fastening and holding the sealing strip 10 in position. For example, and referring to FIG. 5, an enlarged partial cross-sectional view of the installation of the sealing strip 10 in an alternate embodiment of a frame assembly, generally illustrated as 120, is illustrated. The frame assembly 120 is an A-frame door construction in which the complete door section is a single piece of material 122 that is rolled onto itself as illustrated. Upon rolled formation the material 122 defines a channel 22' which parallels the form and function of the channel 22 illustrated in FIGS. 2 through 4. The sealing strip 10 is inserted into and locked within the channel 22' as described above with respect to these figures.

Figure 6:
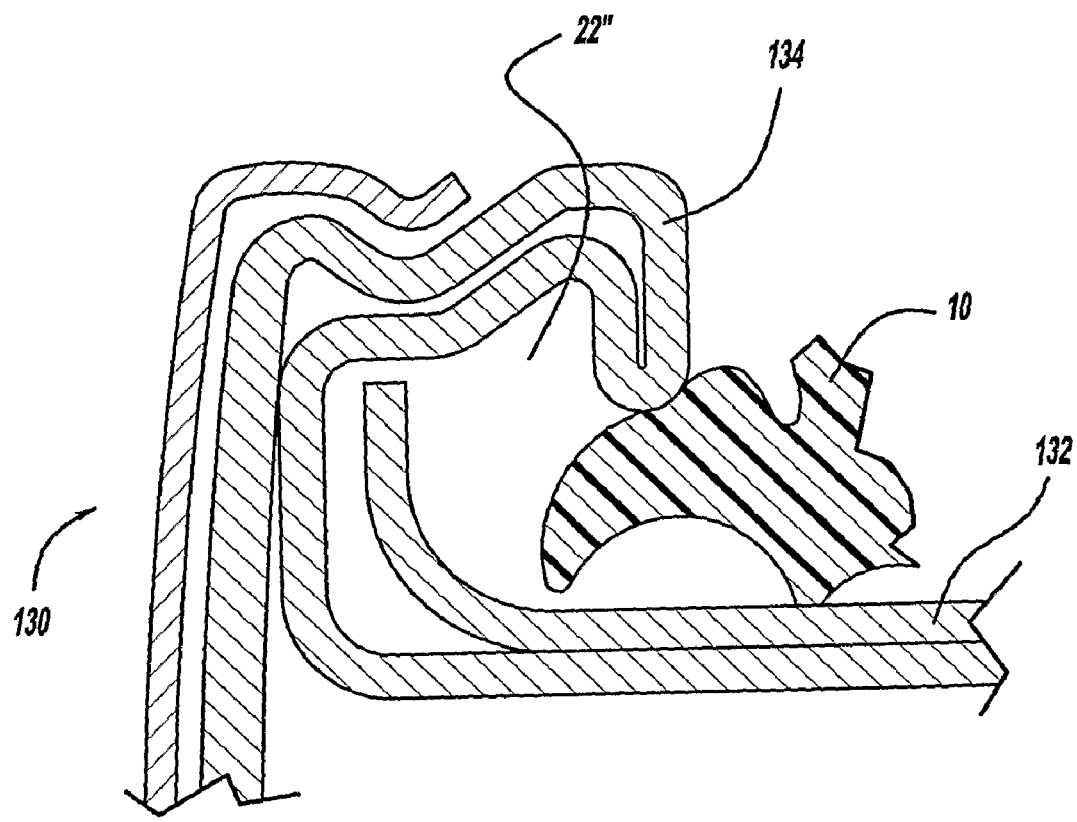
FIG. 6 is an enlarged partial cross-sectional view of the installation of the sealing strip of the present invention in a further alternate embodiment of a frame assembly.

By way of further example, and referring to FIG. 6, a further enlarged partial cross-sectional view of the installation of the sealing strip 10 in a further alternate embodiment of a frame assembly, generally illustrated as 130, is illustrated The frame assembly 130 is a sash door which includes a stamped leg 132 which defines the inner portion and a rolled frame header 134 which defines the outer portion. Upon assembly of the stamped leg 132 and the header 134 a channel 22" is defined. As with the channels 22 and 22' described above, the channel 22" serves to capture and hold the sealing strip 10.

As noted above, attempts to obtain suitable sealing and retention in sealing strips have led manufacturers to use different materials for the sealing and retention sections. For example, the prior sealing sections include reinforcement in the retention section to improve rigidity and retention integrity, and/or include hollow chambers in the retention section. However, each of these approaches increases the manufacturing complexity of the strip. Conversely, the sealing strip 10 of the present invention includes an enhanced retention section configuration that improves the sealing strip retention characteristics even in relatively large channel openings such as 7.5 mm, and ease of installation characteristics even in relatively smaller frame member openings such as 4.5 mm, thereby allowing for the sealing strip of the present invention to be used in conjunction with a greater range of widths of frame member openings. These improved characteristics may be beneficial in permitting the manufacturing of the sealing strip 10 out of multiple materials and by a single extrusion operation. The improved characteristics are also beneficial in assembly and the durability of the sealing strip 10.

While the specific type of material for each of these uses may vary, the retention and sealing sections of the illustrated embodiment are preferably formed using a single material of suitable density. Particularly suitable materials include valcunizable elastomers and thermoplastic elastomers such as sponge or foamed elastomers. By way of further illustration, the material is preferably an EPDM sponge having a density in the range of about 0.5 to about 0.7 g/cm$^3$. Other suitable materials include thermoplastic elastomers, such as those having a density in the range of about 0.8 to about 1.0 g/cm$^3$. These materials have been found to be particularly suitable for the illustrated application as they exhibit sufficient density and rigidity for retention within the channel 22 and sufficient flexibility and resiliency to facilitate installation and sealing. Notwithstanding this discussion of particularly suitable materials and densities, those skilled in the art will appreciate that other materials and/or densities may be used without departing from the scope of the invention defined by the appended claims.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A sealing strip comprising:
   a sealing section having a base portion and a sealing bulb that extends upwardly from the base portion; and
   a retention section integrally formed with and disposed forward of the sealing section, the retention section having an upper hub, a first retention leg positioned forward of the upper hub, an upper recess positioned rearward of and adjacent to the upper hub and adjacent to a sealing arm that extends from the retention section and is disposed forward of the sealing section, a second retention leg positioned completely rearward of the first retention leg and the upper recess, and a single lower recess extending from the first retention leg to the second retention leg such that a continuous concave surface extends from the first retention leg to the second retention leg below the upper recess, the first retention leg engaging the first frame leg and the second frame leg.

2. The sealing strip of claim 1 wherein said retention section is formed of a single material and has a uniform density.

3. The sealing strip of claim 1 wherein the material is an elastomer having a density in the range of about 0.5 g/cm$^3$ to about 1.0 g/cm$^3$.

4. The sealing strip of claim 3 wherein said material is an EPDM having a density in the range of about 0.5 to about 0.7 g/cm$^3$.

5. The sealing strip of claim 1 wherein the material is a thermoplastic elastomer having a density in the range of about 0.8 to about 1.0 g/cm$^3$.

6. The sealing strip of claim 1 wherein said upper hub includes an upper surface and said first retention leg includes a first lower surface having a first distance relative to said upper surface, said second retention leg including a second lower surface having a second distance relative to said upper surface and wherein said lower recess includes a lower recess surface having a recess distance relative to said upper surface for any point along said lower recess, said recess distance being less than said first and second distances.

7. The sealing strip of claim 6 wherein said first distance is greater than or equal to said second distance.

8. The sealing strip of claim 1 wherein said retention section is solid in cross-section.

9. The sealing strip of claim 1 wherein said upper hub has a frame lip contact surface that is convex.

10. A sealing assembly comprising:
    a frame member defining a channel and wherein said frame member includes a first frame leg a second frame leg; and
    a sealing strip including:
      a sealing section having a base portion and a sealing bulb that extends upwardly from the base portion;
      a retention section integrally formed with and disposed forward of the sealing section, the retention section being coupled to said channel and having an upper hub, a first retention leg positioned forward of said upper hub, an upper recess positioned rearward of and adjacent to said upper hub and adjacent to a sealing arm that extends from the retention section and is disposed forward of the sealing section, a second retention leg positioned completely rearward of said first retention leg and said upper recess, and a single lower recess extending from the first retention leg to the second retention leg such that a continuous concave surface extends from the first retention leg to the second retention leg below the upper recess, said first retention leg engaging said first frame leg and said second frame leg.

11. The sealing assembly of claim 10 wherein said frame member defines an opening communicating with said channel, and said frame member includes a frame flange defining an upper end of said opening, wherein said first retention leg engages said second frame leg and is in a deflected condition to create a first biasing force against said frame flange and said fourth frame leg, coupling the sealing strip to said frame member.

12. The sealing assembly of claim 11 wherein said opening has a height and the retention section defines a distance between an upper surface of said upper hub and a lowest surface of said first and second retention legs, and wherein said distance is greater than said height.

13. The sealing assembly of claim 12 wherein each of said first and second retention legs each have a lower surface and wherein said lowest surface is the lower surface of said first retention leg.

14. The sealing assembly of claim 11 wherein said first biasing force is in a substantially horizontal direction to couple the sealing strip to the frame member.

15. The sealing assembly of claim 14 wherein said first and second retention legs contact said first frame leg and are deflected to create a second biasing force in a substantially vertical direction to couple the sealing strip to the frame member.

16. The sealing assembly of claim 10 wherein said retention section is solid in cross section, formed of a single material and has a uniform density.

17. The sealing assembly of claim 10 wherein said retention section further includes a body having an arcuate contact surface, wherein said first retention leg is integral with said body and a second free end, wherein said upper hub is positioned rearward of and above said first retention leg, wherein said upper recess is adjacent said upper hub, and wherein said arcuate contact surface is between said first retention leg and said upper hub.

18. A sealing strip comprising:
   a sealing section having a base portion and a sealing bulb that extends upwardly from the base portion; and
   a retention section integrally formed with and disposed forward of the sealing section, the retention section including:
   an upper hub
   a first retention leg positioned forward of the upper hub and having a free end;
   an upper recess positioned rearward of and adjacent to the upper hub and adjacent to a sealing arm that extends from the retention section and is disposed forward of the sealing section, the upper recess having an open upper end to permit rearward deflection of the upper hub;
   an arcuate contact surface between the first retention leg and the upper hub;
   a second retention leg positioned completely rearward of the first retention leg and the upper recess; and
   a single lower recess extending from the first retention leg to the second retention leg such that a continuous concave surface extends from the first retention leg to the second retention leg below the upper recess such that the lower recess extends both rearward and forward of the upper hub and the upper recess.

19. The sealing strip of claim 18 wherein said retention section is solid in cross-section and is formed of a single material.

20. The sealing strip of claim 18 wherein said first retention leg extends below said second retention leg.

21. The sealing strip of claim 18 wherein said open upper end of said upper recess faces a first direction and said lower recess has an opening facing a direction substantially opposite said first direction.

* * * * *